United States Patent
Ogino

(10) Patent No.: US 8,889,998 B2
(45) Date of Patent: Nov. 18, 2014

(54) CONDUCTOR STRUCTURE, TRANSPARENT DEVICE, AND ELECTRONIC DEVICE
(75) Inventor: Tsuyoshi Ogino, Tokyo (JP)
(73) Assignee: Taiyo Yuden Co., Ltd., Tokyo (JP)
( * ) Notice: Subject to any disclaimer, the term of this patent is extended or adjusted under 35 U.S.C. 154(b) by 222 days.
(21) Appl. No.: 13/582,845
(22) PCT Filed: Mar. 7, 2011
(86) PCT No.: PCT/JP2011/055214
§ 371 (c)(1),
(2), (4) Date: Sep. 5, 2012
(87) PCT Pub. No.: WO2011/111650
PCT Pub. Date: Sep. 15, 2011

(65) Prior Publication Data
US 2012/0325522 A1  Dec. 27, 2012

(30) Foreign Application Priority Data
Mar. 9, 2010  (JP) ................................ 2010-052382

(51) Int. Cl.
| | |
|---|---|
| H05K 1/11 | (2006.01) |
| H01Q 1/24 | (2006.01) |
| H01Q 1/38 | (2006.01) |
| H01P 3/00 | (2006.01) |
| H01P 3/08 | (2006.01) |
| G06F 3/041 | (2006.01) |
| G02F 1/1343 | (2006.01) |

(52) U.S. Cl.
CPC ................ *H01Q 1/243* (2013.01); *H01Q 1/38* (2013.01); *H01P 3/003* (2013.01); *H01P 3/081* (2013.01); *G06F 3/041* (2013.01); *G02F 1/13439* (2013.01)
USPC .......................................... 174/261; 174/257
(58) Field of Classification Search
USPC ................................................ 174/257, 261
See application file for complete search history.

(56) References Cited
U.S. PATENT DOCUMENTS
| | | |
|---|---|---|
| 4,728,176 A | 3/1988 | Tsuboyama et al. |
| 5,312,643 A | 5/1994 | Yamamoto et al. |

(Continued)

FOREIGN PATENT DOCUMENTS
| | | |
|---|---|---|
| GB | 2338580 A | 12/1999 |
| JP | 58-137908 A | 8/1983 |

(Continued)

OTHER PUBLICATIONS
Japanese Office Action dated Nov. 1, 2013, in a counterpart Japanese patent application No. 2012-504445.

(Continued)

*Primary Examiner* — Jeremy C Norris
(74) *Attorney, Agent, or Firm* — Chen Yoshimura LLP

(57) ABSTRACT

Disclosed is a conductor structure provided with a transparent conductive film that can reduce a resistance value in a high-frequency band, while ensuring transparency. Also disclosed is an electronic device provided with the conductor structure. On the main surface of a glass substrate (10) that constitutes a display section of a mobile phone and the like, a signal electrode (20) as a signal line is formed, and GND electrodes (30, 40) connected to the ground are formed so as to sandwich the signal electrode (20). On the side faces at both edges of the signal electrode (20), metal auxiliary lines (22, 24) having a fine line width are formed. Furthermore, on the respective edge portion side faces of the GND electrodes (30, 40) facing the signal electrode (20), metal auxiliary lines (32, 42) having a fine line width are also formed. The signal electrode (20) and the GND electrodes (30, 40) are formed of the transparent conductive film, and the line width of the metal auxiliary lines (22, 24, 32, 42) are set to a line width that does not affect the transparency, i.e., 30 μm or smaller.

7 Claims, 4 Drawing Sheets

(56) References Cited

U.S. PATENT DOCUMENTS

| | | | |
|---|---|---|---|
| 6,175,393 B1 * | 1/2001 | Ban et al. | 349/39 |
| 6,900,470 B2 | 5/2005 | Kobayashi et al. | |
| 2009/0058283 A1 | 3/2009 | Tanaka et al. | |

FOREIGN PATENT DOCUMENTS

| | | |
|---|---|---|
| JP | 58-165213 A | 9/1983 |
| JP | 62-090623 A | 4/1987 |
| JP | 62-160424 A | 7/1987 |
| JP | 4-186229 A | 7/1992 |
| JP | 2000-075807 A | 3/2000 |
| JP | 2001-242468 A | 9/2001 |
| JP | 2002-318556 A | 10/2002 |
| JP | 2006-058815 A | 3/2006 |
| JP | 2006-236747 A | 9/2006 |
| JP | 2009-064612 A | 3/2009 |

OTHER PUBLICATIONS

Written Opinion (PCT/ISA/237) issued in PCT/JP2011/055214 mailed in Apr. 2011.
International Search Report (ISR) issued in PCT/JP2011/055214 mailed in Apr. 2011.

* cited by examiner (A) Transmittance Characteristics (B) Reflection Characteristics (A)

(B)

(C)

(D)

(E)

(F)

(G)

CONDUCTOR STRUCTURE, TRANSPARENT DEVICE, AND ELECTRONIC DEVICE

TECHNICAL FIELD

The present invention relates to a conductor structure provided with a transparent conductive film and to an electronic device provided with the conductor structure.

BACKGROUND ART

Wireless communication portable terminals such as mobile phones are becoming significantly more sophisticated, smaller, and lighter. Also, with increasing demands for high-speed and high-volume communication, high-frequency communication in which signals are sent and received by using microwave or millimeter wave is rapidly spreading. From this perspective, a compact, light-weight, and thin-profile high-frequency circuit that is compatible with microwave or millimeter wave is sought after.

On the other hand, with a recent trend toward a larger screen size, a display section of a wireless communication portable terminal often has a relatively large area. Therefore, if it is possible to mount a device in the display section, the mounting area of the device can be expanded. When mounting a device in the display section, it is necessary to adopt a technique to make the device to be mounted invisible to human eyes so as not to block a user's sight.

A technique of using a transparent conductive film to form such a device in a microwave band or a millimeter band or transmission lines to that device is known, for example. Patent Document 1, for example, discloses a transparent electrode having excellent etching property and high transmittance.

RELATED ART DOCUMENT

Patent Document

Patent Document 1: Japanese Patent Application Laid-Open Publication No. 2006-236747

SUMMARY OF THE INVENTION

Problems to be Solved by the Invention

The resistance value of a transparent conductive film is greater than that of a metal by about two digits, and therefore, a loss due to the resistance value of the transparent conductive film itself or a mismatch loss due to a difference in the characteristic impedance at a connecting portion between a transparent transmission line and another device is increased.

The resistance value can be reduced by increasing the thickness of the transparent conductive film, but in such a case, transparency of the transparent conductive film would be sacrificed.

As described above, a transparent conductive film that can reduce the resistance value in a high-frequency band such as a microwave band or a millimeter band without sacrificing transparency is needed.

In response to the need, with various embodiments of the present invention, a conductor structure that includes a transparent conductive film and that can reduce the resistance value in a high-frequency band while ensuring transparency, and an electronic device including such a conductor structure are provided.

Means for Solving the Problems

A conductor structure according to one embodiment of the present invention includes a transparent conductive film formed in a display section of an electronic device and a metal auxiliary line having a width that cannot be seen by human eyes, the metal auxiliary line making ohmic contact with an edge portion of the transparent conductive film.

In one embodiment of the present invention, a width of the metal auxiliary line is 30 μm or smaller. In another embodiment, the metal auxiliary line is formed on an edge portion side face of the transparent conductive film. In yet another embodiment, the display section includes wiring that is not transparent, and the metal auxiliary line is formed to overlap the wiring.

An electronic device according to one embodiment of the present invention includes a display section, and in this display section, an electrode or a line having the above-mentioned conductor structure is formed. The above-mentioned and other objects, features, and advantages of the present invention will become apparent from the following detailed description and appended drawings.

Effects of the Invention

With various embodiments of the present invention, a conductor structure provided with a transparent conductive film that can reduce the resistance value in a high-frequency band while ensuring transparency, and an electronic device including such a conductor structure are provided.

DETAILED DESCRIPTION OF EMBODIMENTS

Below, various embodiments of the present invention will be explained with reference to appended drawings.

Figure 1:
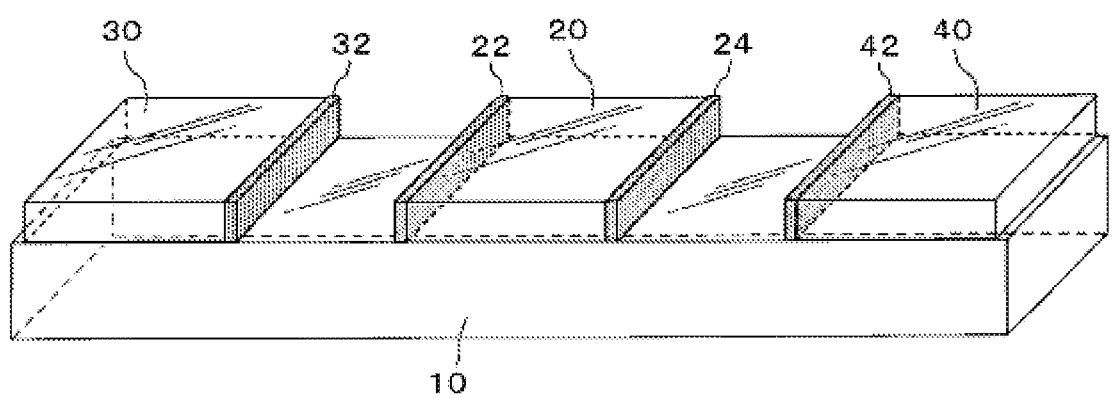
FIG. 1 is a perspective view showing a configuration of a conductor structure according to one embodiment of the present invention.

FIG. 1 shows a coplanar waveguide having a conductor structure according to one embodiment of the present invention. As shown in the figure, the coplanar waveguide includes a signal electrode (signal conductor) 20 as a signal line that is formed on the main surface of a glass substrate 10, which constitutes a display unit of a mobile phone or the like, and GND electrodes (ground conductors) 30 and 40 formed to sandwich the signal electrode 20 on the main surface of the glass substrate 10. The GND electrodes 30 and 40 are connected to the ground. On side faces of both edges of the signal electrode 20, metal auxiliary lines 22 and 24 having a fine line width are formed. The GND electrodes 30 and 40 respectively have metal auxiliary lines 32 and 42 having a fine line width formed on edge portion side faces thereof that respectively face the signal electrode 20.

The signal electrode 20 and the GND electrodes 30 and 40 are formed of transparent conductive films. The signal electrode 20 and the GND electrodes 30 and 40 are formed by any known methods that include physical deposition methods such as a vacuum vapor deposition method, a sputtering method, and a pulse laser deposition (PLD) method, and chemical vapor deposition methods such as a CVD method. Examples of the material of the transparent conductive film include ITO, ZnO, ZnO base oxide with an additive such as Al, Ga, or In, $In_2O_3$—ZnO amorphous oxide, homologous oxide, $TiO_2$, and $TiO_2$ base oxide with an additive, but not limited to such. It is preferable that the transparent conductive film have a low resistance value, which is preferably $1 \times 10^{-2}$ $\Omega \cdot cm$ or lower.

As the material of the metal auxiliary lines 22, 24, 32, and 42 disposed on the edge faces of the transparent conductive films, a metal material that can make ohmic contact with the transparent conductive film such as Al, Ti, In, Ga, or Ag is used, for example. The metal auxiliary lines 22, 24, 32, and 42 are formed by a vapor deposition method or a sputtering method. Because these metal auxiliary lines 22, 24, 32, and 42 are not transparent, the width thereof is set to a level that cannot be seen by a user of the mobile phone upon using. The narrower the metal auxiliary lines 22, 24, 32, and 42 are, the more preferable, but if the line width is 30 μm or smaller, for example, the metal auxiliary lines are not recognized by a user when the user views a display in a normal manner. However, the line width of the metal auxiliary lines 22, 24, 32, and 42 is not limited to this, and is appropriately set in accordance with specifications of a display apparatus or a device to which the present invention is applied.

As described above, in the present embodiment, the main conductor of the coplanar structure is constituted of the signal electrode 20 made of the transparent conductive film and the metal auxiliary lines 22 and 24 disposed on the edge faces thereof, and the respective GND conductors of the coplanar structure are constituted of the GND electrodes 30 and 40 made of the transparent conductive film and the metal auxiliary lines 32 and 42 disposed on the edge faces thereof. Because the metal auxiliary lines 22, 24, 32, and 42 are made of a metal, the electric resistance thereof is significantly lower than that of the transparent conductive film constituting the signal electrode 20 and the GND electrodes 30 and 40. Signals in the microwave band or the millimeter band that flow through the transmission line are concentrated on both edges thereof along the transmission direction. As described above, by disposing the metal auxiliary lines 22 and 24 on the side faces of both edges of the signal electrode 20, the electric current flows through the metal auxiliary lines 22 and 24 in a concentrated manner. Therefore, by providing the metal auxiliary lines 22 and 24, the resistance value for high-frequency signals can be reduced.

The dimensions of the respective elements are as follows, for example: the width of the signal electrode 20 is 200 μm; the width of the GND electrodes 30 and 40 is 200 μm; the width of the metal auxiliary lines 22, 24, 32, and 42 is 20 μm; and the thickness is 1 μm in all of the elements. However, the dimensions are not limited to such.

Figure 2:
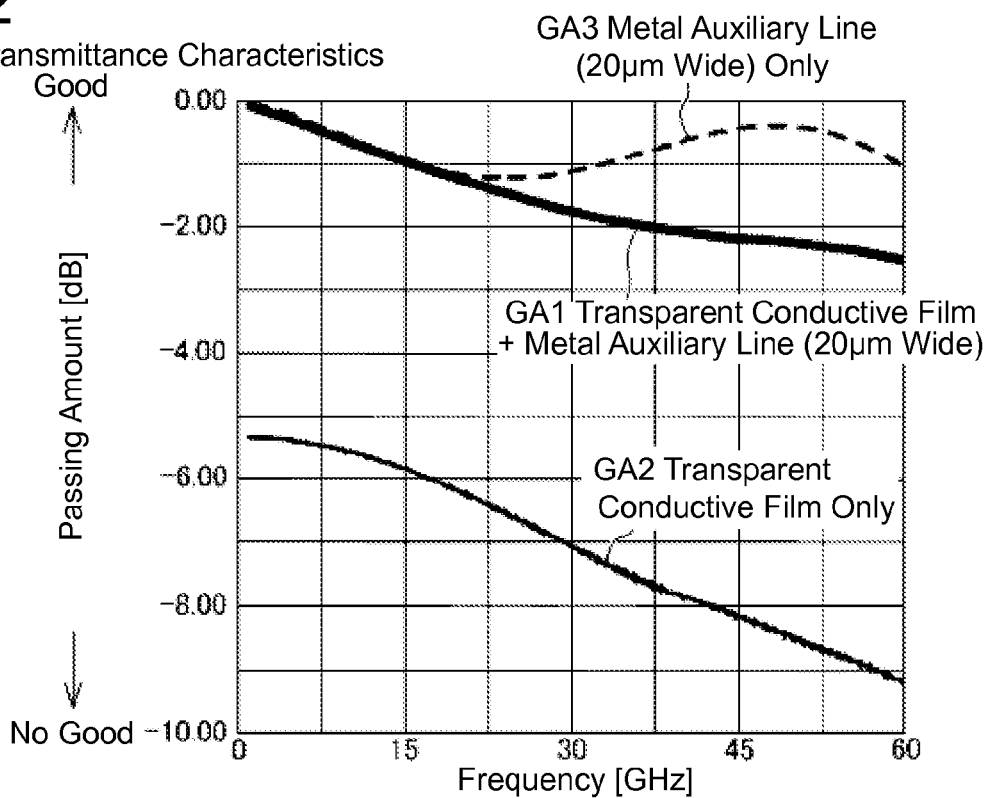
FIG. 2 is a comparison graph showing characteristics of the conductor structure according to the above-mentioned embodiment and characteristics of a conventional technology.
Figure 2:
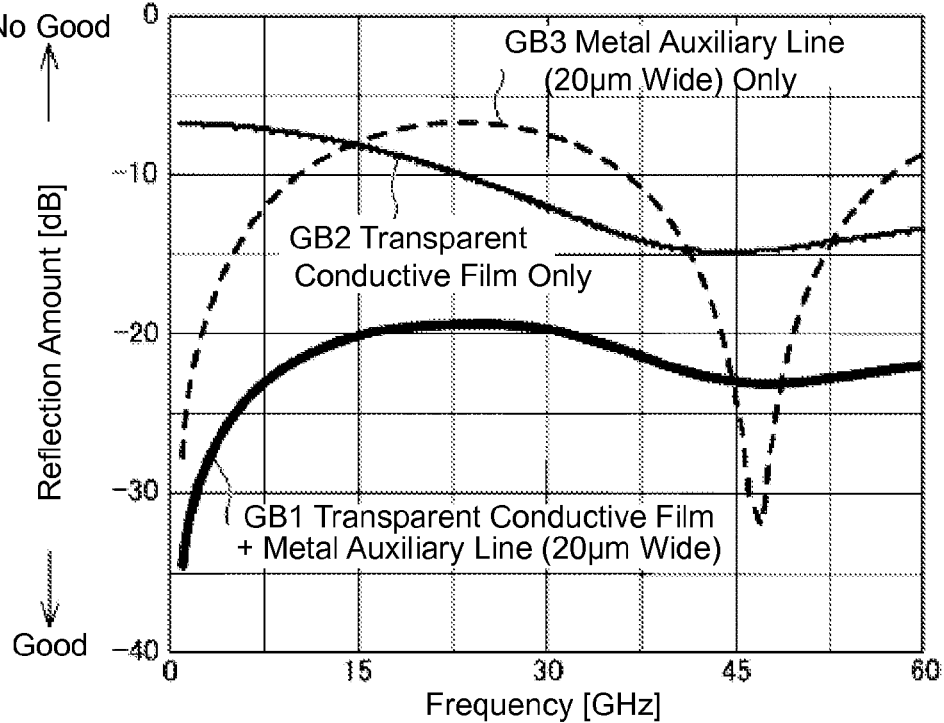

FIG. 2 shows a comparison between the characteristics of the conductor structure according to one embodiment of the present invention and the characteristics of a conventional technology, which were obtained through an electromagnetic field simulation. FIG. 2(A) shows pass characteristics, and FIG. 2(B) shows reflection characteristics. Graphs GA1 and GB1 respectively represent the pass characteristics and the reflection characteristics of the conductor structure according to one embodiment of the present invention having the transparent conductive film (200 μm wide, 1 μm thick) and the metal auxiliary lines (20 μm wide, 1 μm thick). Graphs GA2 and GB2 respectively represent the pass characteristics and the reflection characteristics of the case with the transparent conductive film (200 μm wide, 1 μm thick) only, and graphs GA3 and GB3 respectively represent the pass characteristics and the reflection characteristics of the case with the metal auxiliary lines (20 μm wide, 1 μm thick) only. It is apparent from a comparison between the graph GA1 and the graph GA2 in FIG. 2(A) that the conductor structure according to the present embodiment can achieve a higher passing amount in the frequency domain below 60 GHz than the conductor structure having the transparent conductive film only. Therefore, with the conductor structure of the present embodiment, excellent pass characteristics can be achieved. Also, it is apparent from FIG. 2(B) that the conductor structure of the present embodiment has a lower reflection amount in the frequency domain below 60 GHz than the conductor structure having the transparent conductive film only. Therefore, with the conductor structure of the present embodiment, excellent reflection characteristics can be achieved. It is revealed by the results of this electromagnetic field simulation that by providing the metal auxiliary lines having the line width that cannot be seen by human eyes in the transparent conductive film, an effect of sufficiently improved pass characteristics and reflection characteristics can be obtained.

In the case with the metal auxiliary lines only, although the pass characteristics are improved as indicated with the graph GA3 in FIG. 2(A), the inductance value of the signal line becomes greater, which increases the characteristic impedance. This creates the mismatch with the connecting element, and therefore, the reflection amount is increased as indicated with the graph GB3 in FIG. 2(B).

As described above, according to this embodiment, by providing the metal auxiliary lines on the edge portion side faces of the transparent conductive film, the resistance value at the edges of the transmission line can be reduced, allowing for the significant reduction of the loss in the entire transmission line. Also, because the line width of the metal auxiliary lines is set so as not to be visible to human eyes, the electrode made of such metal auxiliary lines and the transparent conductive film is recognized as transparent.

Figure 3:
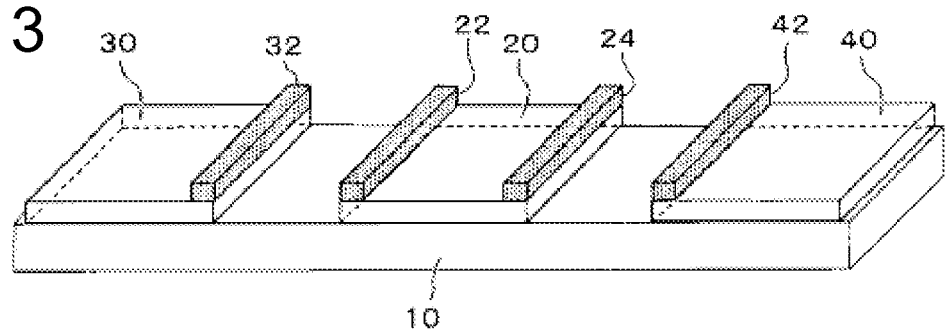
FIG. 3 is a perspective view showing configurations of conductor structures according to other embodiments of the present invention.
Figure 3:
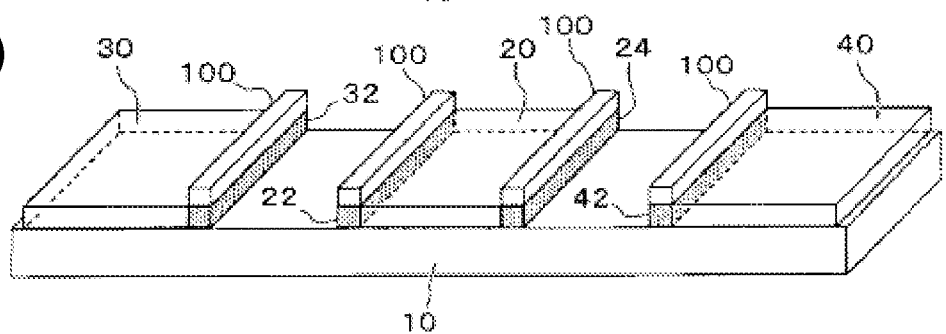
Figure 3:
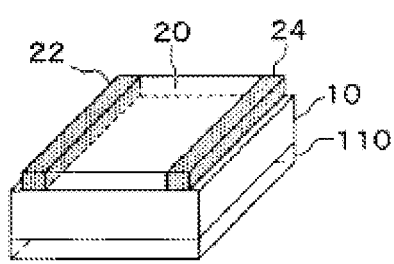
Figure 3:
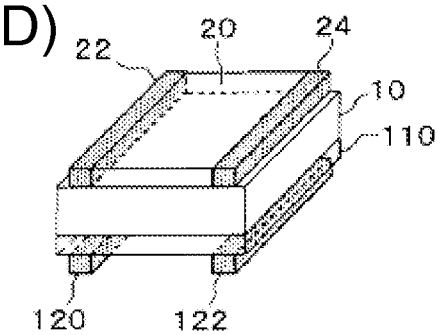
Figure 3:
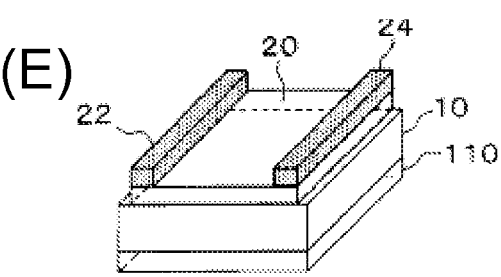
Figure 3:
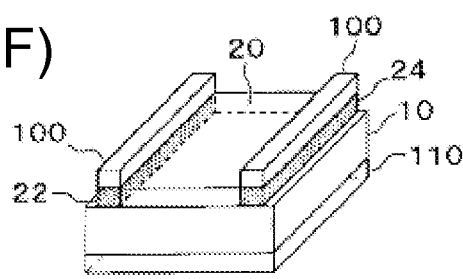
Figure 3:
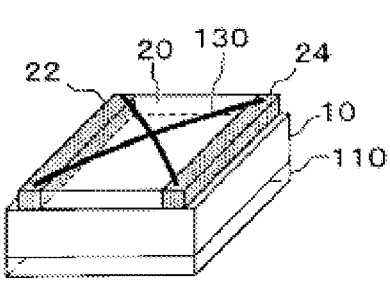

Next, with reference to FIG. 3, conductor structures according to other embodiments of the present invention will be explained. FIG. 3(A) shows the conductor structure according to another embodiment of the present invention. As shown in the figure, in this embodiment, the above-mentioned metal auxiliary lines 22, 24, 32, and 42 are disposed on top surfaces (surfaces opposite to the surfaces facing the display section 10) of the edge portions of the signal electrode 20 and the GND electrodes 30 and 40, instead of the side faces of the edge portions. According to the conductor structure of this embodiment, by the combined resistances between the metal auxiliary lines 22 and 24 and the signal electrode 20, between the metal auxiliary line 32 and the GND electrode 30, and between the metal auxiliary line 42 and the GND electrode 40, the resistance values at the edge portions of the respective electrodes 20, 30, and 40 can be reduced, making it possible to further reduce the loss. FIG. 3(B) shows a conductor structure according to yet another embodiment of the present invention. As shown in the figure, in this conductor structure, transparent conductive films 100 are formed on the metal auxiliary lines 22, 24, 32, and 42 disposed on the side faces of the signal electrode 20 at both edges thereof and the edge portion side faces of the GND electrodes 30 and 40 facing the signal electrode 20, respectively. This embodiment does not require as high accuracy as that of the conductor structure shown in FIG. 3(A) in the process such as forming and processing the metal lines and the transparent conductive films.

In yet another embodiment of the present invention, the metal auxiliary lines 22, 24, 32, and 42 can be disposed on the top surfaces and the side faces of the edge portions of the signal electrode 20 and the GND electrodes 30 and 40, respectively.

FIGS. 3(C) to 3(G) show various examples in which the conductor structures according to various embodiments of the present invention are applied to micro-strip lines. The micro-strip line shown in FIG. 3(C) includes the signal electrode 20 and the metal auxiliary lines 22 and 24 respectively formed on the main surface of the glass substrate 10 and a GND electrode 110 that is disposed on a surface opposite to the main surface of the glass substrate 10 and that is connected to the ground. The metal auxiliary lines 22 and 24 are formed on the side faces of the signal electrode 20 at both edges thereof in a manner similar to the coplanar waveguide in FIG. 1 above. In this embodiment, metal auxiliary lines are not provided to the GND electrode 110. FIG. 3(D) shows a micro-strip line according to another embodiment of the present invention. As shown in the figure, this micro-strip line has metal auxiliary lines 120 and 122 on the main surface of the GND electrode 110 at respective positions corresponding to the metal auxiliary lines 22 and 24, in addition to the configuration shown in FIG. 3(C). As described, by providing the metal auxiliary lines 120 and 122, the resistance value can be reduced as compared with the GND electrode not having the metal auxiliary lines 120 and 122, making it possible to reduce the loss and to reduce the electromagnetic field effect from surrounding circuits. FIG. 3(E) shows a micro-strip line according to yet another embodiment of the present invention. In the micro-strip line shown in this figure, the metal auxiliary lines 22 and 24 are provided at edge portions of the top surface of the signal electrode 20. FIG. 3(F) shows a micro-strip line according to yet another embodiment of the present invention. In the micro-strip line shown in this figure, on the metal auxiliary lines 22 and 24 disposed on the side faces of the signal electrode 20 at both edges thereof, transparent conductive films 100 are further disposed. FIG. 3(G) shows a micro-strip line according to yet another embodiment of the present invention. In this micro-strip line, bypass lines 130 made of a metal are further formed on the micro-strip line shown in FIG. 3(C). The bypass lines 130 include a thin metal line that connects the rear end of the metal auxiliary line 22 to the front end of the metal auxiliary line 24 and a thin metal line that connects the front end of the metal auxiliary line 22 to the rear end of the metal auxiliary line 24. It is preferable that the line width of these metal lines constituting the bypass lines 130 do not exceed the spatial resolution of human eyes so as not to block the sight of a user in viewing displayed information on the display, and the line width is preferably 30 µm or smaller, for example. As described, by setting the line width of the metal lines constituting the bypass lines 130 to 30 µm or smaller, the bypass lines 130 cannot be seen by the user when viewing displayed information on the display.

Figure 4:
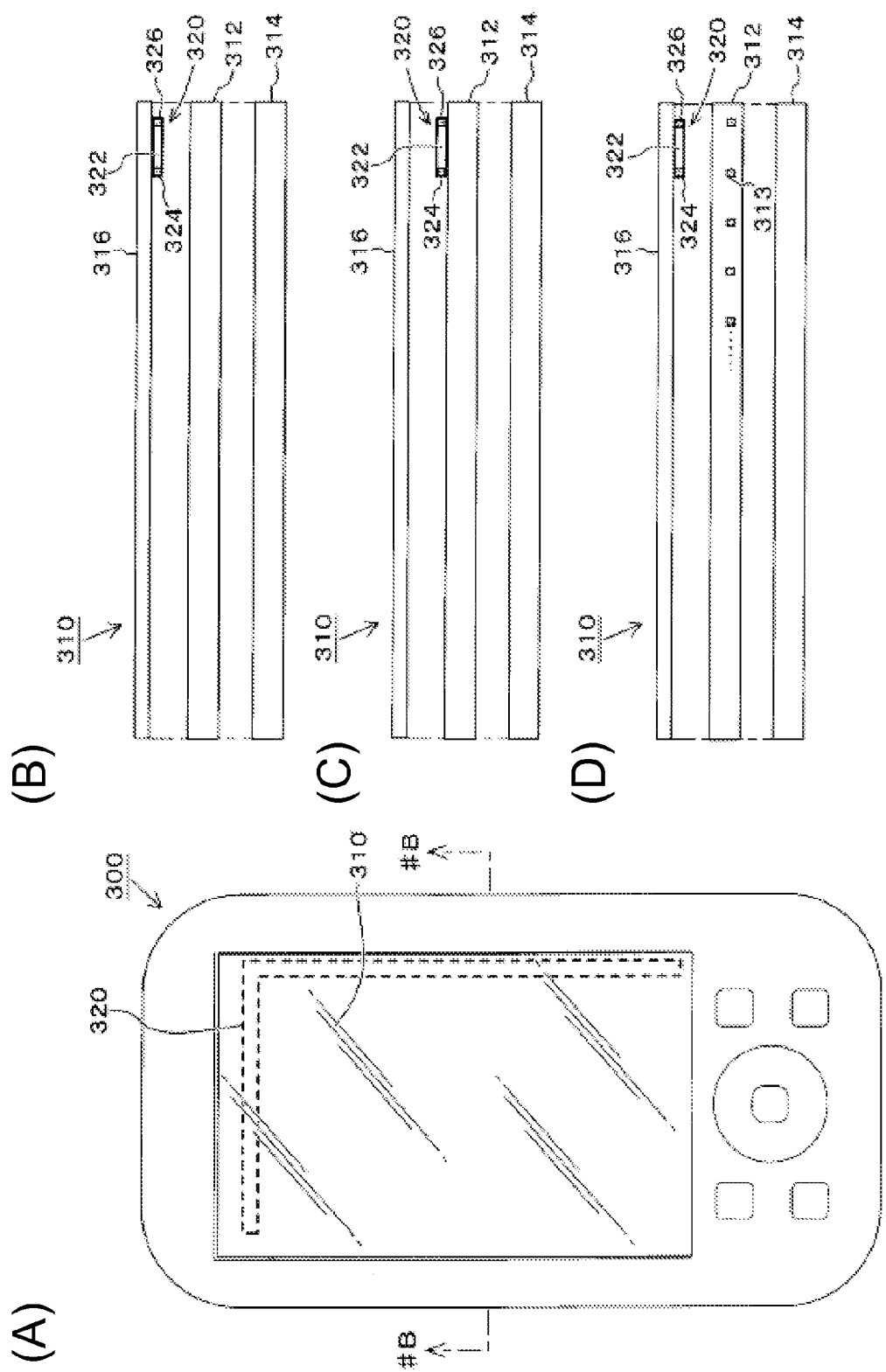
FIG. 4 is a diagram showing an electronic device according to one embodiment of the present invention.

FIG. 4 shows a mobile phone equipped with a display according to one embodiment of the present invention. In this display, a transparent antenna according to one embodiment of the present invention is formed. FIG. 4(A) is a plan view of a mobile phone 300, and FIG. 4(B) is a schematic cross-sectional view along the line #B-#B in FIG. 4(A) in a direction indicated by the arrows. As shown in these figures, a liquid crystal display 310 of the mobile phone 300 has a transparent antenna 320 formed in a reverse L-shape along the outer periphery thereof. The liquid crystal display 310 is configured to have a liquid crystal panel 312, and a backlight 314 and a protective panel 316 are respectively disposed to face the rear surface and the front surface of the liquid crystal panel 312. The transparent antenna 320 is formed on the rear surface of the protective panel 316. The transparent antenna 320 is constituted of a transparent conductive film 322 and metal auxiliary lines 324 and 326 formed on edge portion side faces thereof. The transparent antenna 320 is an antenna having the conductor structure according to one embodiment of the present invention. That is, the metal auxiliary lines 324 and 326 of this transparent antenna 320 are configured to have the line width that allows the metal auxiliary lines 324 and 326 to be invisible to user's eyes when the user of the mobile phone views information displayed on the liquid crystal display 310. As described above, it is preferable that the line width be 30 µm or smaller. The transparent antenna 320 can be formed in any shapes as long as it can be formed within the display 310. Any planar antennas such as a folded type, a loop type, a reverse F type, and a patch antenna can be used as the transparent antenna 320, for example.

FIG. 4(C) shows a display 310 according to another embodiment of the present invention. In the display 310 according to this embodiment, the transparent antenna 320 is directly formed on the surface of the liquid crystal panel 312. In one embodiment, the transparent antenna 320 is formed on the surface of a polarizing plate provided on the surface of the liquid crystal panel 312. FIG. 4(D) shows a display 310 according to another embodiment of the present invention. In the display 310 of FIG. 4(D), the metal auxiliary lines 324 and 326 of the transparent antenna 320 are formed at respective positions facing a driver electrode matrix 313 of the liquid crystal panel 312 (positions overlapping the driver electrode matrix 313 in a laminated direction). In one embodiment, at least part of the metal auxiliary lines 324 and 326 are formed at positions that overlap the driver electrode matrix 313. The width of the transparent conductive film 322 and the inter-electrode space of the driver electrode matrix 313 does not need to coincide with each other.

The present invention is not limited to the above-mentioned embodiments, and various modifications can be made without departing from the scope of the present invention. The conductor structure according to various embodiments of the present invention can be used for various devices and lines, in addition to transmission lines and antennas, for example. The conductor structure according to various embodiments of the present invention can be used for different kinds of display devices such as a display for a laptop computer and different kinds of image sensors, in addition to portable terminals such as a mobile phone as described above. The conductor structure according to various embodiments of the present invention can be used as an electrode or a line of a so-called transparent device. In this specification, a term "transparent device" means a device made of a material having transmittance of 70% or higher in a visible light range. The transparent device is used to constitute display devices of different kinds of electronic devices or different kinds of image sensors, and includes the device made of a transparent conductive film, which has been described in the present specification.

DESCRIPTIONS OF REFERENCE CHARACTERS 10 glass substrate
20 signal electrode
22, 24, 32, 42 metal auxiliary line
30, 40 GND electrode
100 transparent conductive film
110 GND electrode
120, 122 metal auxiliary line
130 metal auxiliary line 300 mobile phone
310 liquid crystal display
312 liquid crystal panel
313 driver electrode matrix
314 backlight
316 protective panel
320 transparent antenna
322 transparent conductive film
324, 326 metal auxiliary line

The invention claimed is:

1. A conductor structure, comprising:
a transparent conductive film for a display section of an electronic device, the transparent conductive film having a prescribed width and having side edges generally extending along a direction in which current is to flow; and
a metal auxiliary line having a width that cannot be seen by a human eye, said width being smaller than the prescribed width of the transparent conductive film, the metal auxiliary line being formed along at least one of said side edges of the transparent conductive film and being in direct contact with the transparent conductive film at or adjacent to such side edge thereof.

2. The conductor structure according to claim 1, wherein the width of the metal auxiliary line is set to 30 μm or smaller.

3. The conductor structure according to claim 1, wherein the metal auxiliary line is formed on a face of said at least one of said side edges of the transparent conductive film and is substantially absent on a top surface of the transparent conductive film.

4. A transparent device, comprising an electrode or a line having the conductor structure according to claim 1.

5. An electronic device, comprising a display section, wherein the display section has an electrode or a line having the conductor structure according to claim 1 formed therein.

6. The electronic device according to claim 5, wherein the display section includes wiring that is not transparent, and the metal auxiliary line is formed so as to overlap the wiring.

7. The conductor structure according to claim 1, wherein the metal auxiliary line is formed on a portion of a top surface of the transparent conductive film abutting said at least one of said side edges, the metal auxiliary line being substantially absent on a face of said at least one of said side edges of the transparent conductive film.

* * * * *